Patented Oct. 22, 1929

1,732,532

UNITED STATES PATENT OFFICE

DONALD HOWARD POWERS, OF WILMINGTON, DELAWARE, ASSIGNOR TO E. I. DU PONT DE NEMOURS & COMPANY, OF WILMINGTON, DELAWARE, A CORPORATION OF DELAWARE

PROCESS OF VULCANIZING RUBBER AND ACCELERATOR THEREFOR

No Drawing.  Application filed June 3, 1925. Serial No. 34,732.

This invention relates to the vulcanization of rubber and to new accelerators therefor.

I have discovered that the product resulting from reaction or condensation between 2 mols (molecular equivalents) of an aldehyde, 2 mols of an amine (particularly a primary amine), and either 1 or 2 mols of carbon disulphide, constitutes an excellent vulcanization accelerator. I have also discovered that a similar product or products may be obtained by treating an anhydro-aldehyde-amine with carbon-disulphide, or by treating with an aldehyde the substituted ammonium salt of a mono-substituted dithiocarbamic acid. As far as I am aware, the products resulting from the above described reactions have not heretofore been known.

The combination of equimolecular equivalents of aldehyde, primary amine, and carbon disulphide yields a product having probably the following general formula (I):

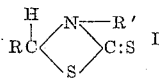

where R represents hydrogen or a hydrocarbon radical, and R' represents an organic radical such as alkyl or aryl. For purposes of nomenclature, compounds of this type may be considered as lactones of alkyl- (or aryl-) α-mercapto-alkyl-dithiocarbamic acids, such acids having the formula:

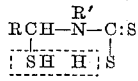

These lactone compounds may consequently be designated alkyl (or aryl-) α-mercapto-alkyl-dithio-carbamolactones.

If, instead of combining equimolecular proportions, 2 mols of an aldehyde and 2 mols of a primary amine are combined with only one mol of carbon disulphide, the resulting product has probably the following general formula (II):

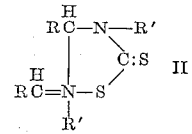

where R represents hydrogen or a hydrocarbon radical, and R' represents an organic radical such as alkyl or aryl or derivatives thereof. This same product may be obtained by heating the first product (having Formula I), two mols of such first product apparently condensing, with liberation of one mol of carbon disulphide.

The products to which the Formula II has been assigned, may be referred to as N-substituted carbothialdines, the term: "carbothialdine" having been first used by Delepine, Bulletin de la Societe Chimique de Paris, 3d series, vol. 15, page 898, to denote the product obtained by combining carbon disulphide, acetaldehyde, and ammonia. These new products, however, may be more correctly designated: N-substituted $(a_1)$-thion-hexahydrothio-$(ab_1)$-diazoles the thio $(ab_1)$-diazole having the graphical formula:

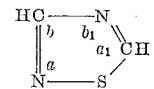

The new products corresponding to either Formulas I or II differ radically from the so-called "carbothialdine" of Delepine, in that the new products are powerful vulcanization accelerators, whereas the "carbothialdine" (from the carbon disulphide, aldehyde, and ammonia) is not a rubber vulcanization accelerator.

In the preparation of the accelerators, I may use as the aldehyde reagent any of the ordinary aldehydes such as formaldehyde, acetaldehyde, propionaldehyde, butyraldehyde, benzaldehyde, etc.; and as the primary amine reagent: mythylamine, ethylamine, hydroxy-ethylamine (amino-ethanol), n- or iso-propylamine, n- or iso-butylamine, aniline, o-toluidine, p-toluidine, etc.

The process of making these accelerators may be illustrated by the following examples:

I. Two mols of butyraldehyde and one mol of carbon disulphide are mixed and treated with two mols of amino-ethanol. The temperature during mixing is held at about 25° C. but after the mixing is complete, the temperature is raised to about 80° C. The resulting heavy oil is nearly pure (a)-butylidene-(b)-propyl-($ab_1$)-di-hydroxyethyl-($a_1$)-thion-hexahydrothio-($ab_1$)-diozole, (or, more briefly, di-ethylol-butylidene-carbothialdine) having probably the following graphical formula:

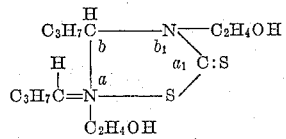

It is obvious from the above formula that hydrogen sulfide is not liberated in substantial amounts from the reaction.

This compound was tested in the following rubber mixture:

| | Parts |
|---|---|
| Smoked sheets | 50 |
| Amber crepe | 50 |
| Zinc oxide | 6 |
| Sulphur | 6 |
| Accelerator | 0.75 |

When cured for 45 minutes at 20 pounds steam pressure, the cured rubber had a tensile of 2400# at 910% elongation.

II. A mixture of two mols of benzaldehyde and one mol of carbon disulphide is treated with two mols of methylamine at 25–30° C. The mixture is then heated to 60° C. for 6–8 hours. On cooling, a precipitate of white needles forms. These crystals are filtered off and washed with a solution of sodium bisulphite to remove any excess benzaldehyde. The material is finally washed with water and then dried. This compound melted at 130° C. and consisted of practically pure dimethyl-benzylidene-carbothialdine.

This accelerator was tested in the rubber formula given above. The resulting rubber which had been cured for 30 minutes at 40# steam pressure had a tensile of 1170# at 980% elongation.

III. Two mols of acetaldehyde are added to one mol of carbon disulphide and the mixture cooled in an ice bath. Two mols of aniline are added slowly, with agitation. The mass soon solidifies. It is heated up to about 70° C. and then allowed to solidify. The product is nearly pure diphenyl-ethylidene-carbothialdine. When 0.75 parts of this compound were incorporated into the rubber compound given above and cured for 30 minutes at 40 pounds steam pressure, the resulting rubber had a tensile strength of 2080# at an elongation of 870%.

IV. Two mols of n-butyraldehyde and one mol of carbon disulphide are mixed with two mols of butylamine

After the liberation of heat ceases, the temperature is raised to 100° C. for one hour. A small aqueous layer forms and is separated. The reaction product consisting of dibutyl-butylidene-carbothialdine is a deep red oil. This may be used directly or may be mixed with substances such as clay or zinc stearate to form a solid product. A crystalline compound may be obtained by the addition of dilute alcohol to the oil. The crystals are approximately equal in strength to the oil.

The liquid product of Example IV has been used in the following formula:

| | Parts |
|---|---|
| Smoked sheets | 50 |
| Amber crepe | 50 |
| Zinc oxide | 6 |
| Sulphur | 6 |
| Accelerator | 0.75 |

When curved under various conditions of temperature and time, the following results were obtained.

| Time | Temp. | Tensile strength | Elongation at break |
|---|---|---|---|
| Min. | Deg. C. | Pounds | Per cent |
| 30 | 121.5 | 3600 | 775 |
| 45 | 121.5 | 4240 | 760 |
| 60 | 121.5 | 4330 | 700 |

Accelerators of the type above described, especially those made from aliphatic aldehydes and amines, are distinguished by their ability to give good cures at low steam pressure (20#) without the attendant bad effects of scorching. Moreover, the time of cure may be quite long either at 20# or 40# steam pressure without producing an overcure. The aging properties of the finished rubber are excellent.

In addition to the products of the above specific examples, many other analogous substances, coming within the generic classes of completely N-substituted carbothialdines and N-alkyl-(or aryl-)α-mercapto-alkyl-dithiocarbamolactones, are valuable vulcanization-accelerators, among which there may be mentioned:

Dimethyl-ethylidene-carbothialdine,
Dimethyl-n-butylidene-carbothialdine,
Diethyl-ethylidenecarbothialdine,
Diethyl-butylidene carbothialdine,
Di-o-tolyl-ethylidene-carbothialdine,
Diphenyl-benzylidene-carbothialdine,
N-methyl-α-mercapto-ethyl-dithiocarbamolactone, N-methyl-α-mercapto-n-butyl-dithiocarbamolactone,
N-ethyl-α-mercapto-ethyl-dithiocarbamolactone,
N-ethyl-α-mercapto-butyl-dithiocarbamolactone,
N-o-tolyl-α-mercapto-ethyl-dithiocarbamolactone,
N-phenyl-α-mercapto-benzyl-dithiocarbomolactone.

(Benzyl and other aryl-methyl radicals are included in the generic term: alkyl.)

Although the process of making the accelerators and of vulcanizing rubber therewith has been illustrated by reference to specific reagents and to specific conditions such as proportions, temperatures, etc., it will, of course, be understood that my invention is not limited to any specific substances or conditions of operation.

I claim:

1. The process of treating rubber which comprises combining with the rubber a vulcanizing agent and a compound obtainable by chemical combination, under conditions preventing substantial liberation of hydrogen sulfide, of an aldehyde, a primary amine, and carbon disulphide, and vulcanizing the rubber mix.

2. The process of treating rubber which comprises combining with the rubber a vulcanizing agent and a compound obtainable by chemical combination of 2 mols of an aldehyde and 2 mols of a primary amine with a whole number of mols less than 3 of carbon disulphide, and vulcanizing the rubber mix.

3. The process of treating rubber which comprises combining with the rubber a vulcanizing agent and a compound obtainable by chemical combination of 2 mols of an aldehyde and 2 mols of a primary amine with about 1 mol of carbon disulphide, and vulcanizing the rubber mix.

4. The process of treating rubber which comprises combining with the rubber a vulcanizing agent and an $(a_1)$-thion-hexahydrothio-$(ab_1)$-diazole having as nuclear substituents, groups of the class consisting of alkyl and aryl groups, and vulcanizing the rubber mix.

5. A process as defined in claim 1 in which the aldehyde and the primary amine are aliphatic compounds.

6. A vulcanized rubber-like material derived from rubber or similar material combined with the product obtainable by chemical combination, under conditions preventing substantial liberation of hydrogen sulfide, of an aldehyde and a primary amine with carbon disulphide.

7. A vulcanized rubber derived from rubber or similar materials combined with sulphur, combined zinc, and the product obtainable by chemical combination, under conditions preventing substantial liberation of hydrogen sulfide, of 2 mols of an aldehyde and 2 mols of a primary amine with a whole number of mols less than 3 of carbon disulphide.

8. A vulcanized rubber derived from rubber or similar materials combined with sulphur, combined zinc, and the product obtainable by chemical combination, under conditions preventing substantial liberation of hydrogen sulfide, of 2 mols of an aliphatic aldehyde and 2 mols of an aliphatic primary amine with a whole number of mols less than 3 of carbon disulphide.

9. Vulcanized rubber obtainable by subjecting to a vulcanization temperature a rubber mix containing rubber, sulphur, zinc oxide, and an accelerator comprising the product resulting from reaction, under conditions preventing substantial liberation of hydrogen sulfide, between 2 mols of an aldehyde, 2 mols of a primary amine, and a whole number of mols less than 3 of carbon disulphide.

10. Vulcanized rubber obtainable by subjecting to a vulcanization temperature a rubber mix containing rubber, sulphur, zinc oxide, and an accelerator comprising the organic product resulting from reaction, under conditions preventing substantial liberation of hydrogen sulfide, between 2 mols of an aliphatic aldehyde, 2 mols of an aliphatic amine, and a whole number of mols less than 3 of carbon disulphide.

11. Vulcanized rubber obtainable by subjecting to a vulcanization temperature a rubber mix containing rubber, sulphur, and a carbothialdine derivative in which groups of the class consisting of alkyl and aryl groups are substituted for the hydrogen atoms ordinarily attached directly to the nuclear nitrogen atoms of carbothialdine.

12. Vulcanized rubber obtainable by subjecting to a vulcanization temperature a rubber mix containing rubber, sulphur, and a dialkyl-alkylidene-carbothialdine.

13. Vulcanized rubber obtainable by subjecting to a vulcanization temperature a rubber mix containing rubber, sulphur, and from about 0.25% to 2.% of a dialkyl-alkylidene-carbothialdine.

14. A rubber-vulcanization accelerator comprising a compound obtainable by the chemical combination, under conditions preventing substantial liberation of hydrogen sulfide, of an aldehyde, a primary amine, and carbon disulphide.

15. A rubber-vulcanization accelerator comprising a compound obtainable by the chemical combination, under conditions preventing substantial liberation of hydrogen sulfide, of an aliphatic aldehyde, an aliphatic primary amine, and carbon disulphide.

16. A rubber-vulcanization accelerator comprising a compound obtainable by the chemical combination, under conditions preventing substantial liberation of hydrogen sulfide, of 2 mols of an aldehyde and 2 mols of a primary amine with a whole number of mols less than 3 of carbon disulphide.

17. A rubber-vulcanization accelerator comprising a compound obtainable by the chemical combination of 2 mols of an aliphatic aldehyde, 2 mols of an aliphatic primary amine, and 1 mol of carbon disulphide.

18. An alkylidene-carbothialdine of the class consisting of dialkyl and diaryl alkylidene-carbothialdine, having a strong accelerating action on the vulcanization of rubber.

In testimony whereof I affix my signature.

DONALD H. POWERS.